Feb. 28, 1967   A. P. NAKOLAN   3,306,552
SEAT BELT RETRACTOR
Filed March 11, 1966
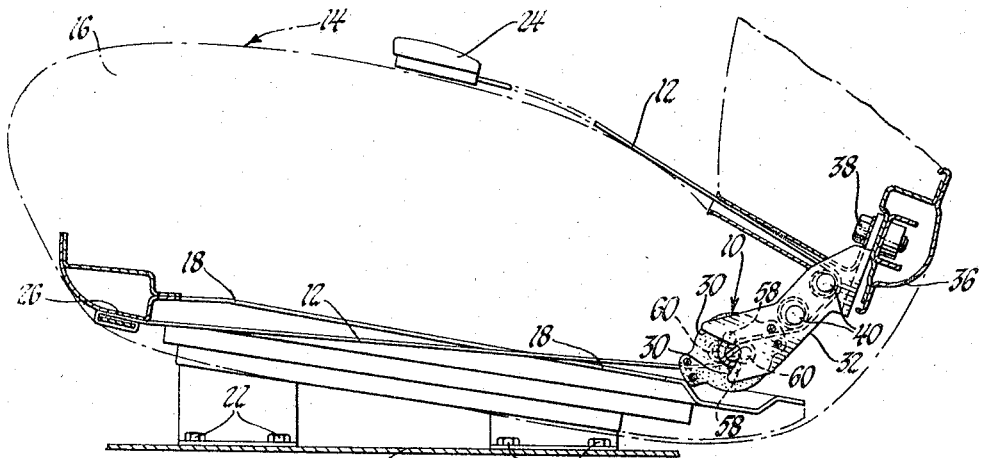
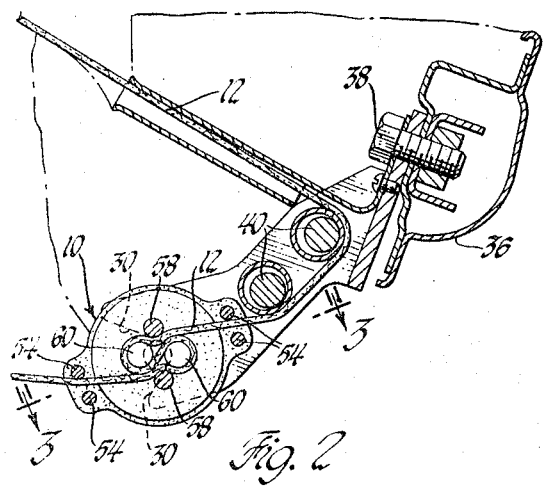
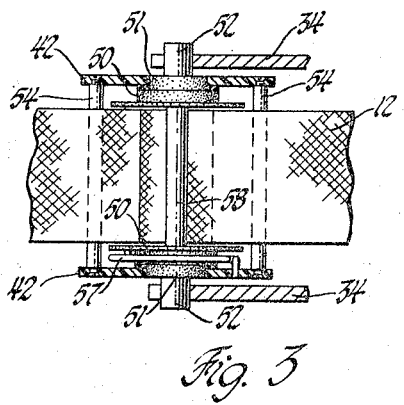
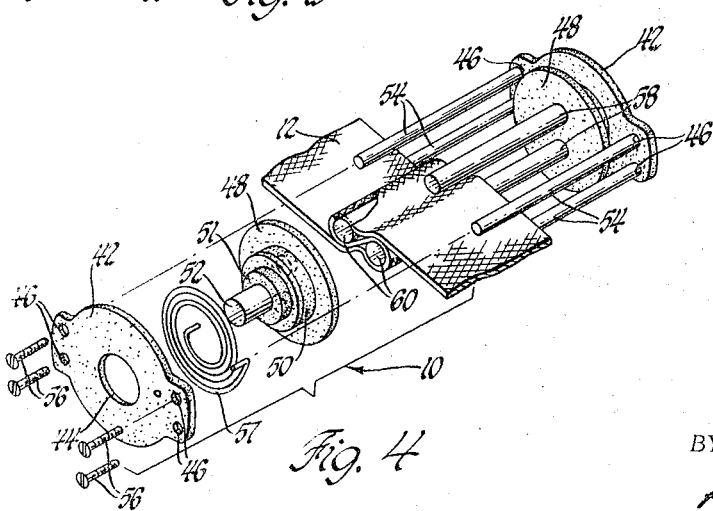
INVENTOR.
Andrew P. Nakolan
BY
Paul Fitzpatrick
ATTORNEY

United States Patent Office 3,306,552
Patented Feb. 28, 1967

3,306,552
SEAT BELT RETRACTOR
Andrew P. Nakolan, New Baltimore, Mich., assignor to General Motors Corporation, Detroit, Mich., a corporation of Delaware
Filed Mar. 11, 1966, Ser. No. 533,480
5 Claims. (Cl. 242—107.11)

This invention relates to a safety device for mounting in a vehicle to restrain the movement of a body within the vehicle when the body is subjected to accelerated movements relative to the vehicle, and more particularly it relates to a safety seat belt retracting mechanism.

The use of seat belts to restrain the movement of driver and passengers in vehicles has become increasingly more popular. The standard seat belt devices comprise a buckle and a lock plate each attached by a different length of belt to the floor of the vehicle on opposite sides of the seat. The lock plate is adapted to be releasably inserted into the buckle mechanism to hold the person within the seat of the vehicle. When not in use, the standard seat belt components create a problem as to storage as they are usually left upon the seat or are strewn upon the floor of the vehicle. As a result, several types of retractor mechanisms have been introduced for the purpose of retracting and storing the seat belt members when not in use. These retractors frequently are of the floor mounted type and also may be of the type that are installed at a location along the belt. Currently used retractors often involve complicated and expensive structural components. Hence, with the wide spread use of four sets of seat belts in each vehicle, the use of such currently known retractors will result in a rather sizable expense. Thus, there is a great need for a relatively simple and economical seat belt retractor, several of which can be installed in a vehicle without substantially increasing the cost of the vehicle.

It is, therefore, an object of this invention to provide a relatively simple and economical retractor mechanism for use in a vehicle to retract and store a safety seat belt when not in use.

Other objects, features, and advantages of this invention will become apparent upon reference to the following detailed description and the drawings depicting the preferred embodiment thereof, wherein:

FIGURE 1 is a schematic view, with parts broken away and in section, of the subject seat belt retractor as applied to a vehicle seat;

FIGURE 2 is an enlarged sectional view of a portion of FIGURE 1;

FIGURE 3 is a sectional view taken in the plane of line 3—3 of FIGURE 2; and

FIGURE 4 is a perspective exploded view of the component parts of the retractor assembly.

More particularly, FIGURE 1 shows a retracting mechanism 10 embodying the subject invention as used with a seat belt portion 12 and a vehicle seat 14. The vehicle seat 14 may be of any suitable type having a cushion 16 and a base frame 18 which is fastened to the floor pan 20 of the vehicle by a plurality of bolts 22. The seat belt portion 12 is attached to a buckle 24 which in turn is adapted to cooperate with a latch plate on the other belt portion or other anchorage (not shown) to secure a person within the seat 14. Thus, it is the task of the retractor assembly 10 to retract the seat belt so that the buckle 24 rests adjacent to the rear portion of the cushion 16. This eliminates the possibility that the buckle 24 will be left on the seat cushion 16 or the vehicle floor when not in use. The seat belt 12 is attached to the forward end 26 of the vehicle seat frame 18. In the position of the parts as shown in the drawings, the portion of the seat belt 12 between the retractor mechanism 10 and the forward end 26 of the seat frame is not normally under any appreciable load and may even be in a somewhat slack condition as the connection between the seat belt 12 and the forward end of the frame 18 is not relied upon to withstand loads applied to the seat belt anchorage.

As shown in FIGURES 1 and 2, the retractor mechanism 10 is positioned in two V-shaped notches 30 in a U-shaped bracket 32. The U-shaped bracket 32 includes a pair of ears 34 and is fastened to the seat rear frame 36 by a bolt 38. The seat belt 12 is guided through the bracket 32 to the retractor mechanism 10 by a pair of guide rollers 40. The guide rollers 40 may be of any suitable type extending between the ear portions 34 of the U-shaped bracket 32 to define a path for the seat belt 12.

As best seen in FIGURE 4, the retractor mechanism 10 includes a pair of outer cover plates 42 each having a large central aperture 44 and four small apertures 46 near its outer extremities. The retractor machanism 10 further includes a pair of side walls 48 each attached to a stepped hub having cylindrical portions 50 and 51 and a projecting stub shaft 52. The outer cylindrical hubs 51 and the shafts 52 extend into and through the apertures 44 in the cover plates 42. Thus, the outer cylindrical hubs 51 serve as journals in the apertures 44 for rotation of side walls 48 relative to the cover plates 42. Two pairs of guide pins 54 extend between the cover plates 42 and are fastened thereto by screws 56 passing through apertures 46 to thereby hold the cover plates 42 together as a casing for the rotatable retractor mechanism contained therebetween. The guide pins 54 also serve to define a path for the belt 12 as it enters and leaves the retractor 10 and provides a means by which the retractor 10 is mounted on the belt 12. A spring 57 is mounted around one hub 50 and fixed at its ends to one cover plate 42 and one side wall 48. This spring is positioned to bias the retractor in the retracting direction (counterclockwise as shown in FIGURES 1 and 2).

Instead of the usual single rod forming the spindle of such a seat belt retracting mechanism, the spindle of this device includes a pair of closely spaced parallel pins 58 which are rigidly fastened to the end plates 48. A second pair of floating pins 60 are held adjacent to the pair of fixed pins 58 within the seat belt 12, which is wrapped in a figure-eight fashion between the pins 58 and around the floating pins 60. Thus, it can be seen that any tensile loads applied to the seat belt 12 tend to urge the floating pins 60 radially inwardly thereby squeezing the belt between the fixed pins 58 and the floating pins 60. This arrangement effectively holds the seat belt against slippage relative to the spindle while at the same time it permits the belt to be adjusted relative to the spindle by simple loosening the belt and sliding the retractor mechanism along the belt to a desired new position. It can further be seen that upon rotation of the cylindrical rods 52 and the end plates 48 in the counterclockwise direction under the action of spring 57 the effective spindle formed by the pins 58 and 60 will rotate thereby with retracting the seat belt 12 from both ends. It should be further noted that the combination of pins 58 and 60 provide a relatively large effective diameter spindle upon which the seat belt 12 can be wound for quick retraction.

As best seen in FIGURE 3 the stub shafts 52 are adapted to reside in the V-shaped wedge 30 in the U-shaped bracket 32. It is the interaction between the cylindrical rods 52 and the V-shaped wedges 30 in the ears 34 of bracket 32 which provides the load withstanding structure of this assembly. Thus, upon application of sudden loads on the seat belt 12 the retractor mechanism 10 is moved such that the stub shafts 52 are forced into the wedges 30 thereby locking the retractor mechanism against further movement. Thus, in the withdrawn position upon the release of the buckle 24 the retractor mechanism 10 will be spring biased to rotate itself along the length of the seat belt 12 beneath the seat 14 thereby retracting the seat belt 12 into the retracting mechanism from boh ends and pulling the seat belt buckle 24 to the rear of the seat cushion 16. Upon withdrawal of the seat belt 12 the retractor mechanism 10 will rotate along the seat belt 12 under the seat until it is positioned within wedge 30 of the ears 34 of the bracket 32. Upon impact loads being applied to the belt 12 stub shafts 52 become jammed within the wedge 30 as explained previously to prevent further movement of the retractor 10.

Thus, an extremely simple retractor mechanism with relatively few parts is provided which can effectively retract a seat belt when not in use. The component parts of this retractor mechanism are very few in number and simple in structure thereby resulting in a substantial economic saving over standard seat belt retractor mechanisms.

Although but one embodiment of the subject invention has been shown and described in detail, it should be clear to those skilled in the art to which the invention pertains that many changes may be made thereto without departing from the scope of the invention.

I claim:
1. A take-up device for retracting a belt comprising:
    a pair of side walls;
    a pair of parallel, closely spaced pins fixed to said side walls;
    a pair of floating pins held by said belt which extends around said floating pins and between said fixed pins in a figure-eight pattern;
    and biasing means to rotate said take-up device thereby coiling said belt around said pins and retracting said belt from both ends relative to the take-up.
2. A take-up device as set forth in claim 1 wherein the wrapping of said belt around said floating pins and between said fixed pins results in the impingement of said belt between said pins upon tension being applied to said belt.
3. A take-up device as set forth in claim 2 wherein said side walls are rotatably mounted to a fixed structure and said biasing means is attached between said fixed structure and said side walls.
4. A take-up device as set forth in claim 3 wherein one end of said belt is attached to the frame of a vehicle seat and the other end to a seat belt buckle.
5. The combination as set forth in claim 4 further including a bracket means fixed to said vehicle seat and adapted to restrain movement of said take-up device upon the application of sudden loads to said belt, said belt passing through said bracket means to said take-up device.

References Cited by the Examiner

UNITED STATES PATENTS

| | | | |
|---|---|---|---|
| 2,963,080 | 12/1960 | Zang | 297—388 |
| 3,257,147 | 6/1966 | Carter | 297—388 |
| 3,262,653 | 7/1966 | Laupot | 242—107.11 |

FRANK B. SHERRY, *Primary Examiner.*

CASMIR A. NUNBERG, *Examiner.*